United States Patent [19]
Irwin

[11] 3,911,672
[45] Oct. 14, 1975

[54] COMBUSTOR WITH CERAMIC LINER

[75] Inventor: John A. Irwin, Indianapolis, Ind.

[73] Assignee: General Motors Corporation, Detroit, Mich.

[22] Filed: Apr. 5, 1974

[21] Appl. No.: 458,073

[52] U.S. Cl. .............................. 60/39.32; 60/39.69
[51] Int. Cl.² .......................................... F02C 7/20
[58] Field of Search............ 60/39.31, 39.32, 39.65, 60/39.69; 415/214; 431/352, 350, DIG. 12

[56] References Cited
UNITED STATES PATENTS

| | | | |
|---|---|---|---|
| 2,564,497 | 8/1951 | Navias | 60/39.65 |
| 2,674,846 | 4/1954 | Bloomer | 60/39.65 |
| 2,686,655 | 8/1954 | Schorner | 415/214 |
| 3,007,312 | 11/1961 | Shutts | 60/39.65 |
| 3,594,109 | 7/1971 | Penny | 60/39.65 |

FOREIGN PATENTS OR APPLICATIONS 691,430   5/1940   Germany ........................... 60/39.65

Primary Examiner—C. J. Husar
Assistant Examiner—L. J. Casaregola
Attorney, Agent, or Firm—Paul Fitzpatrick

[57] ABSTRACT

A combustor for a gas turbine engine embodies a ceramic liner the upstream or dome end of which has a central opening. The liner is supported from the combustion chamber housing by an annular structure defining an abutment which engages the inner surface of the dome adjacent the opening and by a ring, biased by a spring reacting against the housing, engaging the outer surface of the dome adjacent the opening.

5 Claims, 4 Drawing Figures

COMBUSTOR WITH CERAMIC LINER

This invention is directed to combustion apparatus such as is used in a gas turbine engine, and particularly to combustion liner structure for such apparatus.

By way of background, most gas turbine combustion apparatuses include a liner within which combustion takes place. Such liners ordinarily are of circular or annular cross-section, with an upstream end called a dome and an outlet at the downstream end for combustion products. Fuel is sprayed at the upstream end and air enters through the upstream end and through the side wall of the liner to effect combustion and to dilute the combustion products to a suitable temperature.

Although walls of many combustion apparatuses have been made of various ceramic materials, practical gas turbine combustion liners, so far I am aware, have been made of high temperature resisting metal alloys. Such metal alloy structures have good hot strength and a relatively high degree of durability. However, such combustion liners are very expensive; therefore, if ceramics can be substituted for the metal to provide a satisfactory liner, considerable savings may result.

While various known ceramics are highly resistant to heat and may be formed into cylinders and other shapes by known techniques, such materials are relatively weak and brittle. Also, the ceramics have relatively low thermal expansion, which presents a problem when it becomes necessary to mount them with metal components in an engine combustion apparatus.

This invention is directed to a structure which facilitates the employment of ceramic elements for the major portion of a combustion liner so as to retain the cost and temperature resisting advantages of the ceramic while avoiding stresses on the ceramic material which would be likely to cause cracking or breaking.

Generally stated, in a combustion apparatus according to my invention, a ceramic combustion liner, preferably of one-piece construction, includes a side wall and an inwardly extending upstream end portion defining the outer portion of the dome of the combustion liner. There is a central opening in this dome portion, and the margin of the dome around the opening engages an abutment extending from the outer wall or housing of the combustion apparatus. The liner is biased resiliently against this abutment by spring means reacting against the housing. The liner is thus supported with sufficient rigidity but without danger of applying destructive forces to the liner due to vibration or to differential expansion of the parts.

The principal objects of my invention are to provide improved and more economical combustion liners for gas turbine engines, to provide improved means for mounting a ceramic combustion liner in gas turbine or other combustion apparatus; and to provide improved support for a ceramic combustion liner.

The nature of the invention and its advantages will be more clearly apparent to those skilled in the art from the succeeding detailed description of preferred embodiments of the invention and the accompanying drawings thereof.

Figure 1:
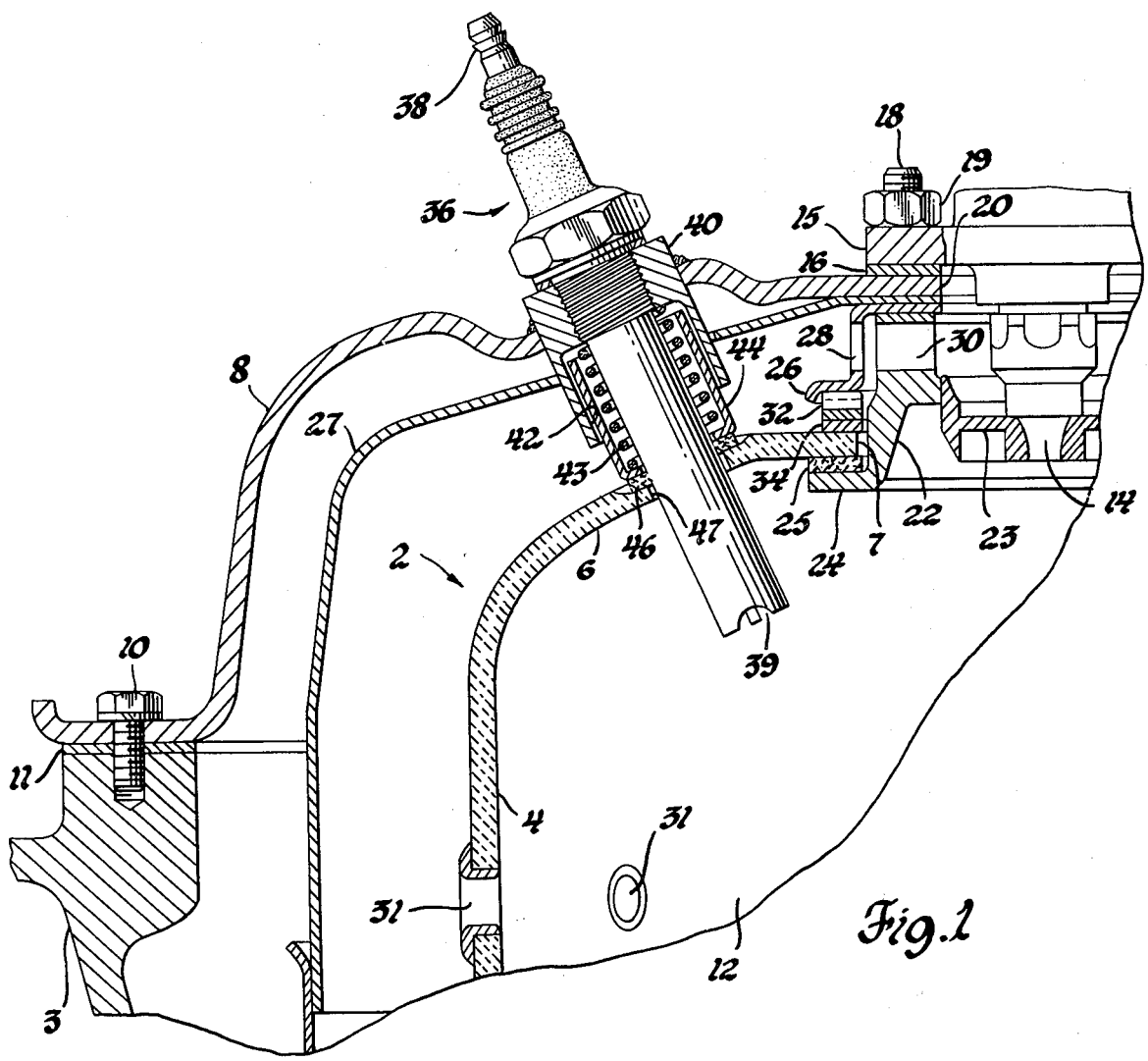
FIG. 1 is a partial sectional view illustrating the upstream end of a combustion apparatus, the view being taken on a plane containing the axis of the combustion liner.

The figures illustrate a combustion liner as installed in a gas turbine engine of known type which may be similar to those described in U.S. Pat. Nos. as follows: Collman et al No. 3,077,074, Feb. 12, 1963; Collman et al No. 3,267,674, Aug. 23, 1966; and Bell No. 3,490,746, Jan. 20, 1970. The combustion liner 2 may be mounted in a suitable space within the engine, a portion of the frame or housing of the engine being designated as 3. The combustion liner illustrated is an integral ceramic structure of circular cross section including a generally cylindrical side wall 4 and a converging upstream end or dome portion 6. A circular opening 7 is located centrally in the dome portion. The downstream end of the liner (not illustrated) may discharge through suitable structure into a turbine, as is generally understood.

The liner is supported from a combustion chamber cover 8 forming part of the housing of the engine and of the combustion apparatus. The combustion chamber cover may be secured around its periphery by cap screws 10 and be sealed by a gasket 11. Fuel is sprayed into the combustion zone of the liner, indicated generally at 12, by a fuel spray nozzle 14 which includes a mounting flange 15 held against a gasket 16 by studs 18 extending through the cover 8 and bearing nuts 19. The fuel nozzle extends through an opening 20 in the cover which is closed by the flange 15. Studs 18, which may be three in number, extend from an annular abutment 22 which surrounds the fuel nozzle 14. An air swirler 23, which may be part of the fuel nozzle casting, is disposed between the fuel nozzle spray tip and the abutment 22.

The abutment 22 includes a flange 24 which engages the inner surface of the dome 6 around the opening 7. A slightly yieldable or resilient gasket 25 of high temperature resistant material such as a ceramic felt is disposed between the flange 24 and the ceramic liner. An annular spring reaction member 26 and an air baffle 27 are disposed between the abutment 22 and the inner side of the cover 8. The air baffle 27 serves to shield the cover 8 from heat radiating from hot parts of the engine and also serves somewhat to guide combustion air towards the liner. Such combustion air can flow in part through sets of holes 28 in the reaction member and 30 in the abutment to reach the air swirler 23. Additional combustion air is delivered into the combustion zone through ports 31 distributed around the liner. Additional air for dilution of the combustion products may enter farther downstream of the liner, as is well known and is not illustrated in FIG. 1.

The liner 2 is biased against the flange 24 by a circular wave spring 32 which bears against the outer surface of the liner through a rigid washer 34. This washer serves to prevent application of undue localized force on the liner at the high points of the convolutions of wave spring 32. As will be apparent, the spring provides secure location of the liner and couples it with sufficient rigidity to the support or abutment 22 while avoiding undue pressure or destructive crushing force on the liner because of the resilient nature of the structure. Also, the resilient structure is tolerant of relative expansion of the metal and ceramic parts. Ordinarily, the abutment 22 will be hotter than and will expand more than the reaction member 26. Wave spring 32 accommodates this relative expansion axially of the liner. Also, the clearance between the opening 7 and the side wall of the abutment is sufficient to allow for relative radial expansion of the metal and ceramic parts without providing too much latitude in the location of the liner.

FIG. 1 also shows the installation of an igniter for the combustion apparatus. The igniter 36 includes a terminal or electrical input end 38 and a sparking electrode arrangement 39. The details of the igniter are immaterial to the invention. The igniter is threaded into a cup-shaped socket 40 extending through an opening in the cover 8 and welded in place. A cylindrical cavity 42 in the socket 40 receives a coil compression spring 43. This spring bears against a generally cylindrical guide 44 which is slidable within the socket 40. The guide has an inturned flange against which the spring 43 bears and which bears in turn against a washer or gasket 46. The gasket bears against a flat exterior surface portion of the dome which surrounds a port 47 in the dome through which the igniter extends. The gasket is made of a suitable somewhat yielding heat resistant material such as a ceramic felt, for example. It prevents undesired air flow through the port 47 which could create thermal stresses by cooling the dome wall around port 47. The spring 43 can yield to accommodate expansion of the liner and prevent undue loading of the liner while restricting flow through the port 47.

Figure 2:
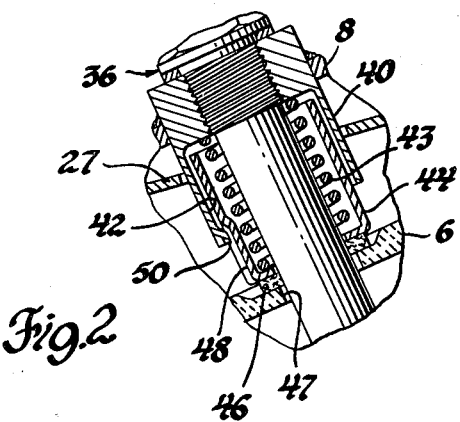
FIG. 2 is a detailed view illustrating a modified arrangement for mounting the igniter of the combustion apparatus.

FIG. 2 illustrates a slight modification of the structure. It includes means to retain the guide 44 in the socket 40. In this form the guide 44 has a groove 48 impressed in it. After the guide is installed, the margin of the socket is deformed as indicated at 50 to prevent ejection of the guide from its socket.

Figure 3:
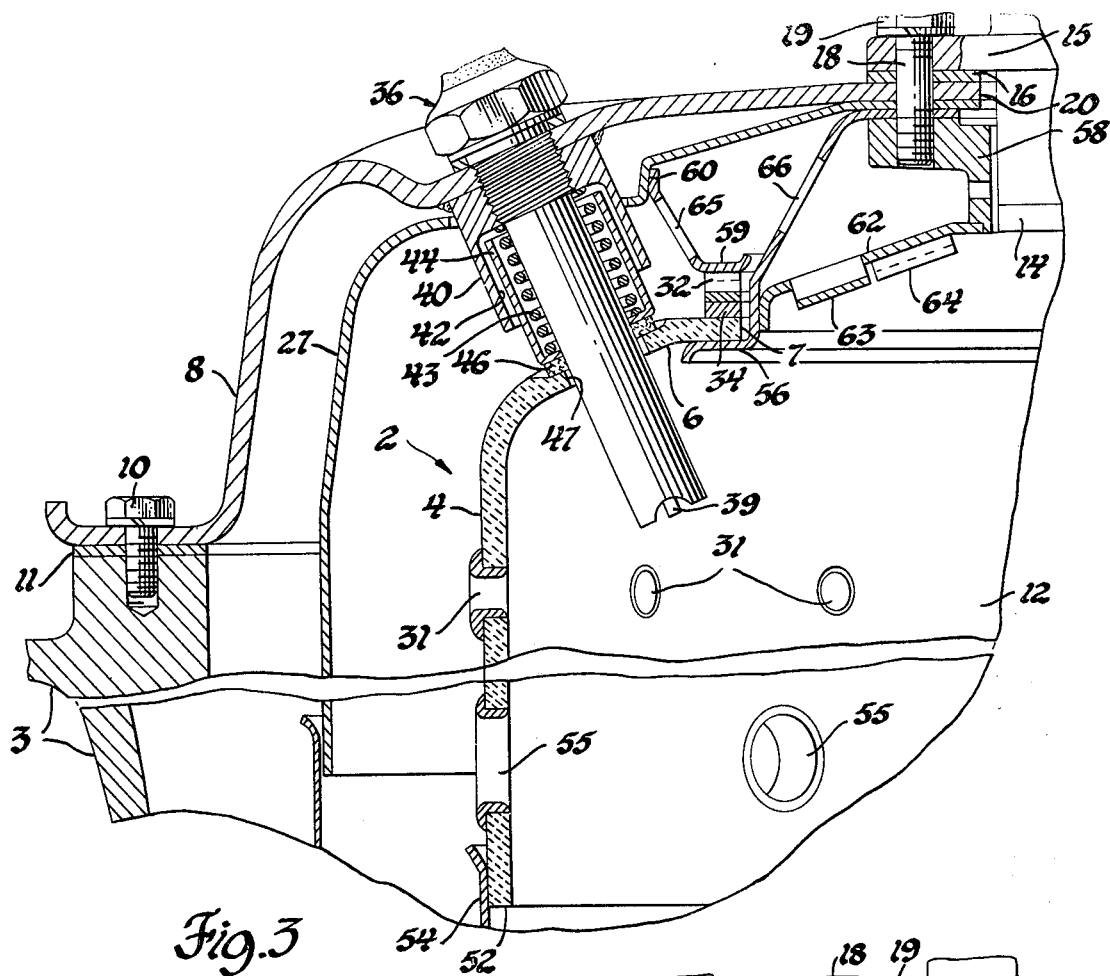
FIG. 3 is a view similar to FIG. 1 of a second embodiment of the invention.
Figure 4:
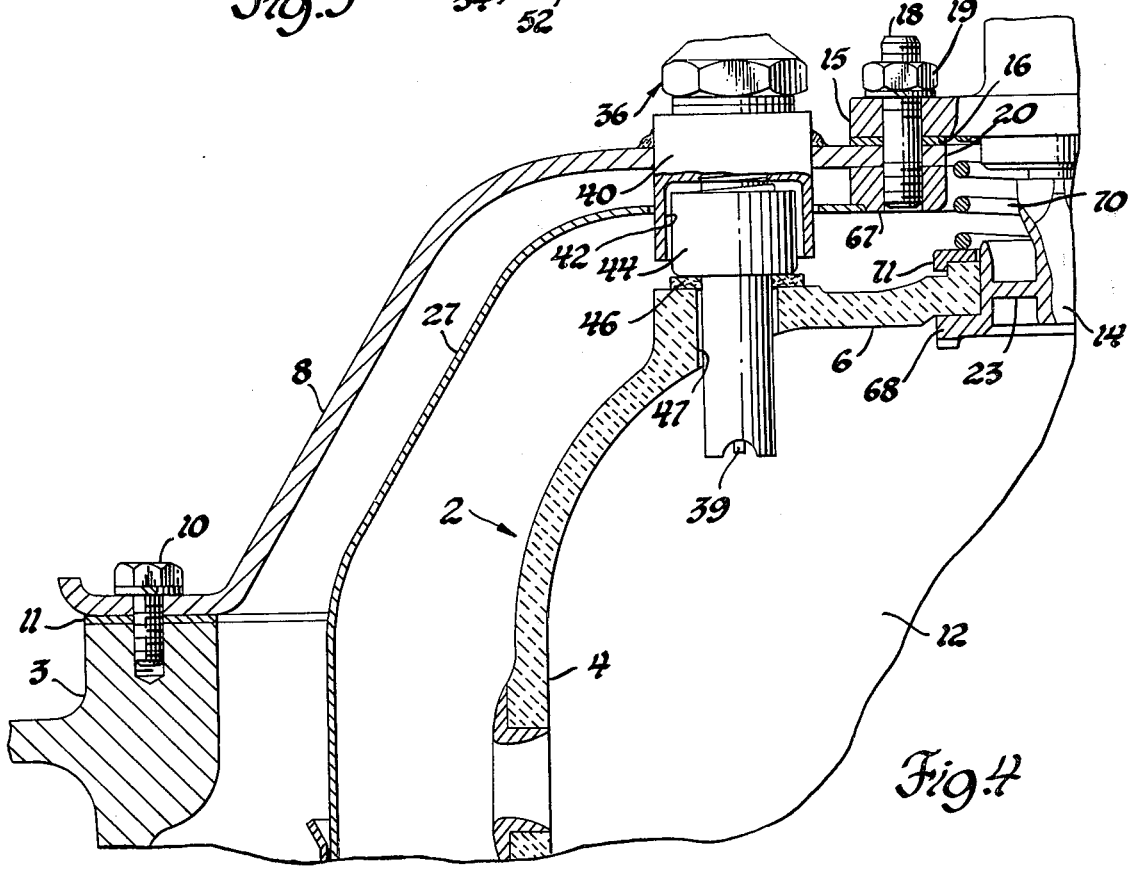
FIG. 4 is a view similar to FIG. 1 of a third embodiment of the invention.

FIGS. 3 and 4 illustrate different structural embodiments of the invention. For conciseness of the description, the parts which are common to FIG. 1 and which have only minor modifications in form will be identified by the same reference numerals as in FIG. 1, and the description of these parts will not be repeated.

FIG. 3 shows the intermediate portion of the liner 2 broken away and shows the discharge end 52 of the liner received in ducting 54 for conducting the combustion products to the turbine. FIG. 3 also illustrates dilution air ports 55 in the downstream portion of the liner.

The structure in FIG. 3 which differs from that previously described includes a somewhat cup-shaped sheet metal abutment ring 56 with a marginal portion which underlies the dome adjacent the opening 7. This abutment ring is mounted between a ring 58 and the cover 8. Studs 18 extend through the cover from the ring 58 and extend also through the ring 56 and the air baffle 27. The spring reaction member in this case is a ring 59 seated in a recess 60 in the baffle 27. The ring 59 may be simply lodged in place or may be fixed, as by welding. A wavy spring washer 32, as in the previously described form, bears against the outer surface of the dome through a rigid washer 34. An air swirler ring 62 fixed to the ring 58 extends outwardly into contact with the abutment ring 56. The swirler ring is formed to provide air entrance louvers 63 and 64 for introduction of primary air around the fuel nozzle 14. Air is admitted to these louvers through circumferentially distributed holes 65 in the ring 59 and 66 in the abutment ring 56. It will be seen that, while this provides a different structure for admission of air and some structural differences, the mounting of the liner and of the igniter remain much as described before.

In the structure of FIG. 4, the fuel nozzle 14 is mounted on the cover by studs 18 which in this case extend from a ring 67 at the inner margin of the opening in the air baffle 27. The air swirler 23 is integral with the nozzle 14 and bears at its outer margin in abutment flange 68. The combustion liner is retained in place against this flange by a coil spring 70 impinged between a surface on the nozzle flange 15 and a washer 71 which bears against the outer surface of the combustion liner dome. The installation of the igniter, although somewhat different structurally, is much the same in principle as those already described.

It will be noted that in all the embodiments the spring which acts to hold the liner in place, whether it by wavy spring 32 of FIGS. 1 and 3 or coil spring 70 of FIG. 4, is in position to be cooled by air flowing to the inlet air swirler of the combustion liner which is disposed around the fuel spray head.

It will be apparent to those skilled in the art from the foregoing description that the structures described provide for adequate support of the ceramic liner which is such as not to allow it to shake and rattle and yet is not so rigid as to cause danger of cracking or chipping of the liner.

The detailed description of the preferred embodiment of the invention for the purpose of explaining the principles thereof is not to be considered as limiting or restricting the invention, since many modifications may be made by the exercise of skill in the art.

I claim:

1. A combustion apparatus for a gas turbine engine including a support; a combustion liner of ceramic material, the liner having a side wall and a converging wall portion at the upstream end of the side wall surrounding an opening at the upstream end of the liner; abutment means extending from the support through the said opening and bearing against the inner side of the liner wall portion around the opening; and resiliently-biased means reacting against the support and bearing against the outer side of the liner wall portion around the opening to press the liner against the abutment means and support the liner with freedom for relative expansion of the liner and the liner supporting means including the abutment means and the resiliently-biased means.

2. A structure as recited in claim 1 in which the resiliently-biased means is biased by an annular wave spring.

3. A structure as recited in claim 1 in which the resiliently-biased means is biased by a coil spring.

4. A combustion apparatus for a gas turbine engine having a housing including a wall; a combustion liner of ceramic material mounted within the housing, the liner having a side wall and a converging wall portion at the upstream end of the side wall surrounding an opening at the upstream end of the liner; abutment means extending from the housing wall through the said opening and bearing against the inner side of the liner wall portion around the opening; and resiliently-biased means reacting against the housing wall and bearing against the outer side of the liner wall portion around the opening to press the liner against the abutment means and support the liner from the housing wall with freedom for relative expansion of the liner and the liner supporting means including the abutment means and the resiliently-biased means.

5. A combustion apparatus for a gas turbine engine having a housing including a wall; a combustion liner of ceramic material mounted within the housing, the liner having a side wall and a converging wall portion at the upstream end of the side wall surrounding an opening at the upstream end of the liner; abutment means extending from the housing wall through the said opening and bearing against the inner side of the liner wall portion around the opening; and resiliently-biased means reacting against the housing wall and bearing against the outer side of the liner wall portion around the opening to press the liner against the abutment means and support the liner from the housing wall with freedom for relative expansion of the liner and the liner supporting means including the abutment means and the resiliently-biased means; and fuel spraying means mounted on the housing wall adapted to introduce fuel through the said opening.

* * * * *